United States Patent [19]

Chapman

[11] 4,431,165

[45] Feb. 14, 1984

[54] LINE STRINGING APPARATUS WITH LONGITUDINALLY ARRANGED HOOK SHANKS

[76] Inventor: Claude L. Chapman, 3300 W. Union Ave., Englewood, Colo. 80110

[21] Appl. No.: 359,841

[22] Filed: Mar. 19, 1982

[51] Int. Cl.³ .............................................. B66D 1/36
[52] U.S. Cl. ............................................ 254/134.3 R
[58] Field of Search ............... 254/134.3 R, 134.3 PA; 258/1.2

[56] References Cited

U.S. PATENT DOCUMENTS

| | | |
|---|---|---|
| 3,845,937 | 11/1974 | Johnson et al. |
| 4,006,884 | 2/1977 | Lederhos et al. |
| 4,247,084 | 1/1981 | Lindsey et al. |
| 4,278,237 | 7/1981 | Bergman et al. |
| 4,386,758 | 6/1983 | Despins ...................... 254/134.3 R |

Primary Examiner—Robert C. Watson
Attorney, Agent, or Firm—Ancel W. Lewis, Jr.

[57] ABSTRACT

A line stringing apparatus particularly suitable for stringing the center line of a tower entirely from an aircraft while suspending a threading member (11) to which a threading line (16) is attached. An elongated threading member (11) carries a hook-shaped leading line coupling part (12) that is oriented so that the shank portion (21) is lengthwise of, the bend portion (22) is transverse to, and a free end portion (23) extends back toward the trailing end of the threading member. A hook-shaped trailing line coupling part (13) is opposite to, spaced from, and faces the hook of the leading line coupling part. The trailing shank portion (41) is arranged substantially lengthwise of, the trailing bend portion (42) is substantially transverse to, and the trailing free end portion (43) extends back toward the leading end of the threading member. The trailing shank portion pivots about a pivot (49) that is substantially transverse to the threading member to swing between a horizontal position and an upright position when suspended by the aircraft. An upper catch (61) and a lower catch (62) on the same bracket on the threading member temporarily secure the threading member to the tower.

10 Claims, 7 Drawing Figures

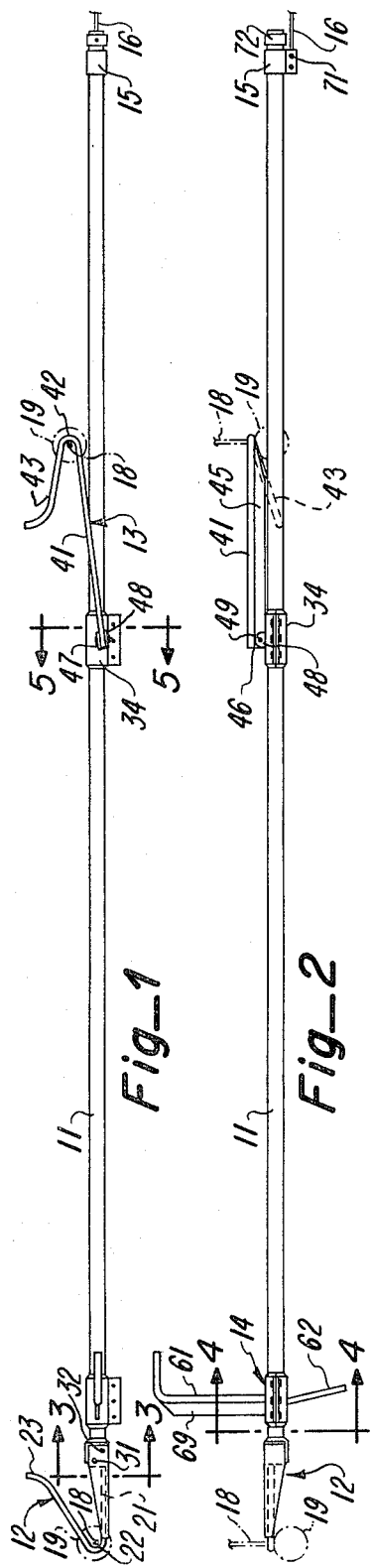
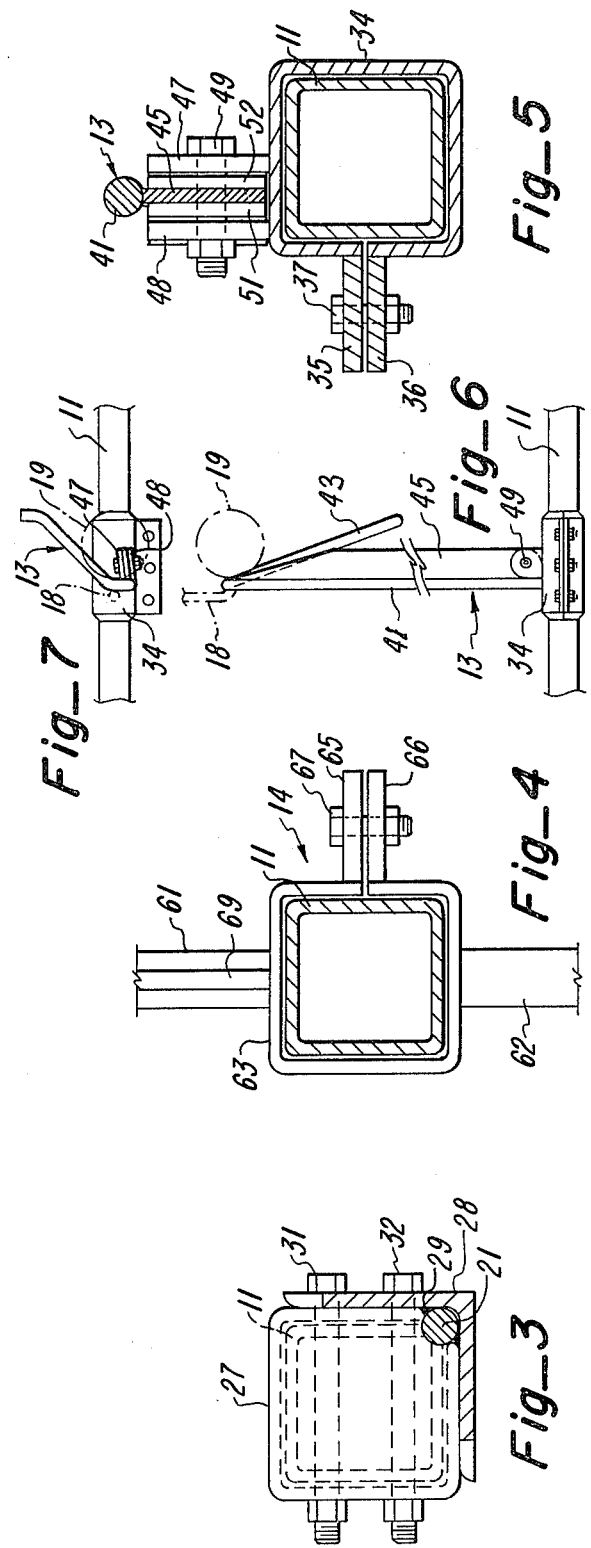

LINE STRINGING APPARATUS WITH LONGITUDINALLY ARRANGED HOOK SHANKS

TECHNICAL FIELD

This invention relates to improvements in apparatus for the airborne stringing of a sock or threading line through power line towers and particularly those towers that have no side access such as for the stringing of the center line surrounded by a closed-sided, window-like tower structure.

BACKGROUND ART

In my copending applications Ser. Nos. 103,348, filed Dec. 13, 1979, now U.S. Pat. No. 4,328,952 and 154,878, filed May 30, 1980, now U.S. Pat. No. 4,348,009 there are disclosed apparatus and methods for line stringing wherein an elongated threading member having a threading or sock line secured to the trailing end is passed through the line. These earlier threading members have leading and trailing hoist line coupling parts mounted on the threading member to facilitate suspending the device from an aircraft. At least one tower catch facilitates holding the threading member on the tower while the hoist line is released and reattached to the threading member. The operation is carried out entirely from above by the aircraft without the necessity of personnel or apparatus on the tower.

An earlier attempt to string the center line of a tower with no side access is disclosed in U.S. Pat. No. 4,006,884. The apparatus disclosed therein requires a complex structure mounted on the tower to catch and guide each of the two parts of a coupling between the hoist line and the threading line to guide one coupling part to attach one end of a pre-hung line and the other coupling part to the other end of the pre-hung line. The pre-hung line connects in and becomes a part of the hoist line and the threading line.

DISCLOSURE OF INVENTION

Stringing apparatus disclosed includes an elongated threading member on which there are mounted a leading coupling part and a trailing coupling part, to which a hoist line is alternately coupled to suspend the threading member from an aircraft and decoupled when the threading member is held by a tower catch. The line coupling parts are hook-shaped, with an improved construction and arrangement such that a shank portion of the hook extends along the threading member from which there extends a bent portion and a free end portion. The bent portion in the hook extends substantially transverse to the threading member and locates a hoist line carried therein in the center of the threading member when suspended from above by the hoist line to stabilize the threading member by preventing it from rotating or twisting about its center. The trailing line coupling part pivots about an axis arranged substantially transverse to the threading member. The hooked shapes of the two coupling parts are generally opposed to and face one another so that the hoist line will slide directly from the leading coupling part along the threading member into the trailing coupling part when transferring the hoist line from one to the other.

BRIEF DESCRIPTION OF DRAWINGS

The details of this invention will be described in connection with the accompanying drawings, in which:

FIG. 1 is a top plan view of line stringing apparatus embodying features of the present invention, with the hoist line and ball shown in dashed lines in an operating relationship with each of the line coupling parts of said apparatus;

FIG. 2 is a side elevational view of the line stringing apparatus shown in FIG. 1;

FIG. 3 is a sectional view taken along lines 3—3 of FIG. 1;

FIG. 4 is a sectional view taken along lines 4—4 of FIG. 2;

FIG. 5 is a sectional view taken along lines 5—5 of FIG. 1;

FIG. 6 is a side elevational view of a portion of the apparatus shown in FIG. 1 with the trailing line coupling part in a raised position suspended by the hoist line and ball; and FIG. 7 is a top plan view of the trailing line coupling part in the vertical position shown in FIG. 6.

DETAILED DESCRIPTION

Referring now to FIGS. 1-7 of the drawings, the aerial line stringing apparatus shown includes an elongated member 11, preferably constructed of a single piece of hollow aluminum tubing having a square cross section, on which there are mounted a leading line coupling part 12 at the front position and a trailing line coupling part 13 at the intermediate position on the threading member.

A tower catch assembly 14 is mounted on the leading end of the threading member just rearwardly of the leading line coupling part 12. A rear bracket 15 fastens a threading line to the trailing end of the threading member.

The line stringing apparatus operates in association with a hoist line 18 suspended from an aircraft and having an end member 19 carried thereon, shown as in the form of a ball or sphere.

The leading line coupling part 12 shown is constructed of an aluminum or steel rod of circular cross section made in the shape of a hook or hook-shaped, including a straight shank portion 21, a bend portion 22, and a free end portion 23. The hooked coupling part 12 defines a line-receiving opening between the end portion 23 and the shank portion 21 for receiving the hoist line 18 carried by the aircraft and has an inside line-receiving area along the bend portion 22. The center of the bend portion 22 is in line with the center and longitudinal axis of the threading member to locate the hoist line 18 along the same line at the center of the threading member so that, when the line stringing apparatus is carried by the hoist line, the threading member is prevented from twisting about its axis.

The hooked leading line coupling part 12 is oriented in such a way that the shank portion 21 extends substantially lengthwise of the threading member, the bend portion 22 extends substantially transverse to the threading member, and the free end portion 23 extends from the bend portion back toward the trailing end of the threading member. The free end of portion 23 is shown to flare laterally out to provide a wider target for the hoist line, but this flare can be omitted in the interest of having a narrower construction.

Line coupling part 12 is fastened to the front end of the threading member 11 by means of a square tubular sleeve 27 that telescopes over member 11 and an end member 28 of right-angle cross section that fits against one side and the bottom at one corner of sleeve 27 and projects forwardly therefrom. The sleeve 27 and end member 28 are secured to the threading member by two bolt and nut fasteners 31 and 32 that extend therethrough. The inside corner of sleeve 27 provides a seat for the straight shank portion 21. The end of shank portion 21 abuts against the end of member 11. Shank portion 21 is welded to end member 28 as indicated at 29.

In the use of the leading line coupling part 12, the hoist line 18 is passed along the threading member 11 through the receiving opening and against the inside of the bend portion 22, the center of the hoist line being in line with the center of the threading member 11. The ball 19 is pulled against the underside of portion 22 and, because it is of a larger dimension than portion 22, a coupling is formed between the hoist line 18 and the threading member 11.

The trailing line coupling part 13 is also hook-shaped. Line coupling part 13 is pivotally connected at one end to a mounting bracket 34 secured to the threading member 11 to swing between the lowered position shown in FIGS. 1 and 2 and a raised position shown in FIGS. 6 and 7.

Bracket 34 extends around member 11 and has two flanges or lugs 35 and 36 through which extend a bolt and nut fastener 37. This allows the trailing line coupling part 13 to be moved at any position along the threading member. This position is selected so that the trailing line coupling part 13 is at the balance point of the threading member, thus maintaining the threading member in a substantially horizontal plane during the stringing operation.

The trailing line coupling part 13 includes a straight shank portion 41, a bend portion 42, and a free end portion 43. The line coupling part 13 is constructed from a hook-shaped rod of circular cross section forming portions 41, 42 and 43, together with a length of rectangular reinforcing plate 45 that extends along the shank portion of the rod only. In the lower position the reinforcing plate 45 rests on the top of the bracket 34 in a horizontal disposition and in the raised position the end surface 46 of the plate 45 forms a stop to limit the swinging movement of coupling part 13 so that it will not swing beyond a vertical position.

The hooked trailing line coupling part 13 is oriented in the lowered position so that the shank portion 41 extends substantially lengthwise of the threading member, the bend portion 42 extends substantially transverse to the threading member, and the free end portion 43 extends from the bend portion back toward the trailing end of the threading member and down from the shank portion to avoid catching on the tower during the threading operation. The free end of portion 43 is shown to flare laterally out to provide a wider target for the hoist line, but this flare can be omitted in the interest of having the narrowest construction.

The pivotal mounting for line coupling part 13 on member 11 includes a pair of flanges or lugs 47 and 48 located to one side of the top of the bracket 34 and inclined at a slight angle to a line transverse to the longitudinal axis of the threading member so that the shank portion 41 extends across or traverses the threading member as viewed from the top and locates bend portion 42 to one side of the threading member so that the hoist line will readily slide thereinto. A pivot member 49 extending transverse to the threading member in the form of a nut and bolt assembly extends through inclined flanges or lugs 47 and 48, plate 45, and washers 51 and 52 affixed to plate 45 for reinforcement of the hole through which pivot member 49 extends. Pivot member 49 pivotally secures coupling part 13 to the threading member.

Both the leading and trailing line coupling parts are made as left-side or right-side mountings, depending on which side of the tower the hoist line will pass.

In the use initially of the threading line coupling part 13, as shown in FIG. 2, in the lower position the underside of plate 45 rests on the top of bracket 34 to hold the line coupling part 13 in a horizontal position. The hoist line is passed from the leading line coupling part 12 along the threading member and into the trailing line coupling part 13 with the ball 19 disposed below the part 13. Because the ball is of a larger dimension than the hook in part 13, as the hoist line is raised part 13 swings to an upright position. The end surface 46 forms a stop that contacts the top of bracket 34 so that the hook does not swing beyond a vertical position.

As seen in FIG. 7, the trailing bend portion 42 in the upright position is in line with the center of the threading member to locate the hoist line in the center of the threading member to stabilize the threading member in a horizontal plane and prevent the threading member from twisting about its axis while suspended from above.

The arrangement of the shank portion of the hook substantially along or lengthwise of, rather than transverse to, the threading member, with the pivot for the hook along a transverse rather than a longitudinal axis, has the advantage of decreasing the overall width of the device, thereby making it easier to position on the tower. This permits the use of a longer shank to drop the threading member lower into the tower and contributes to a balanced load and to prevent the twisting of the threading member about its axis.

The arrangement of the hooks opposite to and facing one another permits the hoist line to slide out of the leading hook, along the shank, and into the trailing hook with a minimum of manipulation of the hoist line and in a relatively short time span.

The tower catch assembly 14 shown has an upper, inverted, L-shaped catch 61 and a rearwardly inclined lower catch 62 mounted on a common clamp-on bracket 63 secured to the threading member. The bracket 63 telescopes on the threading member and has a pair of lugs 65 and 66 through which extends a pair of bolt fasteners 67 to secure bracket 63 to member 11.

The upper catch 61 is constructed of an L-shaped rod having a circular cross section with an upright leg and a rearwardly extending leg. The upright leg is provided with a rectangular backing plate for added strength. The lower catch 62 is made of a metal rod of circular transverse cross section. The upper catch 61 and lower catch 62 are disposed in a vertical plane as viewed from the end and are maintained in the vertical plane by the particular suspensions above described.

The threading line fastener 15 shown is also a clamp-on bracket of a construction similar to that of bracket 63 above described and is held in place on the threading member by lugs and bolt fasteners 71 that extend therethrough. An end stop 72 prevents the line fastener 15 from sliding off the end of the threading member. The threading line 16 is secured to the bracket 63 between the lugs and nut and bolt fasteners 71.

The preferred procedure used in stringing the line is as follows: The hoist line 18 with the ball 19 on the end is placed in the leading line coupling part with the ball below the coupling part and the line stringing apparatus is moved by the aircraft and set on top of a cross support of a tower or other tower support structure with the lower catch 62 hooked on the tower. The threading line 16 provides a tension to hold the line stringing apparatus in place. The hoist line and ball are removed from the leading line coupling part and the hoist line is inserted into the trailing line coupling part, which is then raised to the upright position shown in FIG. 6.

The line stringing apparatus is then lifted off the tower, backed up, and a forward part of the threading member is threaded through the tower by manipulating the aircraft. The upper tower catch 61 hooks the tower and the stringing apparatus is again supported by the tower. The hoist line and ball are then removed from the trailing line coupling part and hooked into the leading line coupling part and the line is threaded through the tower and moved to the next tower by the aircraft, where the lower tower catch 62 is again set on the top cross support of the tower and the above procedure is repeated.

Although the present invention has been described with a certain degree of particularity, it is understood that the present disclosure has been made by way of example and that changes in details of structure may be made without departing from the spirit thereof.

What is claimed is:

1. Stringing apparatus for passing a threading line through a line holding structure on a tower with no side access while suspended from above by an aircraft carrying a hoist line with an end member, said apparatus comprising:

a threading member;

a hook-shaped leading line coupling part mounted on said threading member at a front position and a hook-shaped trailing line coupling part mounted on said threading member disposed rearwardly of and spaced from said leading line coupling part, said leading line coupling part including a leading shank portion connected at one end to the threading member, a leading bend portion, and a leading free end portion defining a leading line-receiving opening between said leading free end portion and said leading shank portion and an inside line-receiving area along said leading bend portion, said leading shank portion extending substantially lengthwise of said threading member, said leading bend portion extending substantially transverse to said threading member, and said leading free end portion extending from said bend portion toward said trailing end of said threading member, said trailing line coupling part including a trailing shank portion pivotally connected at one end to said threading member, a trailing bend portion, and a trailing free end portion defining a line-receiving opening between said trailing free end portion and said trailing shank portion, and a trailing line-receiving area along the inside of said trailing bend portion, said trailing shank portion extending substantially lengthwise of said threading member, said trailing bend portion extending substantially transverse to said threading member, and said trailing free end portion extending from said bend portion toward said leading end of said threading member and then laterally away from said leading shank portion, said trailing line coupling part being pivotal about an axis substantially transverse to said threading member between a horizontally disposed lowered position and a vertically disposed raised position;

means for fastening a threading line to the trailing end of said threading member; and tower catch means on said threading member for releasably fastening said threading member to the tower after said hoist line is released from said coupling part on said threading member, said hoist line being coupled to said trailing line coupling part for moving the leading end portion of said threading member and leading line coupling part through said structure, said tower catch means engaging the tower, said hoist line being released from said trailing coupling part and coupled to said leading line coupling part, and said threading member and threading line being moved through said structure while suspended from said aircraft.

2. Stringing apparatus as set forth in claim 1 wherein said leading bend portion is in line with the center of said threading member to locate the hoist line along said center to prevent said threading member from twisting about its axis when said hoist line is coupled to said leading line coupling part and said threading member is suspended from said hoist line.

3. Stringing apparatus as set forth in claim 1 wherein said trailing line coupling part has one end of the trailing shank portion pivotally connected at the balance point of said threading member to maintain said threading member in a substantially horizontal plane when suspended from said hoist line.

4. Stringing apparatus as set forth in claim 1 wherein said trailing line coupling part is constructed of a hook-shaped rod of circular cross section having a plate that extends along the shank portion of the rod only, said plate having an end surface that forms a stop to prevent the plate from pivoting beyond a vertical position and a side surface that holds the plate in a horizontal position on the threading member.

5. Stringing apparatus as set forth in claim 1 wherein said trailing shank portion extends across the threading member at an angle to the longitudinal axis of said threading member to locate said trailing bend portion to one side of the threading member as viewed from the top thereof.

6. Stringing apparatus as set forth in claim 1 wherein said trailing bend portion is centered above the center of said threading member when disposed in the raised suspended position to locate the hoist line at the center of said threading member when suspended by said hoist line.

7. Stringing apparatus as set forth in claim 1 wherein said trailing shank portion is substantially longer than the length of said trailing bend portion and trailing free end portion.

8. Stringing apparatus as set forth in claim 1 wherein said tower catch means includes an upper catch extending up and then toward the trailing end of said threading member and a lower catch extending down and then toward said trailing end at an angle, said upper and lower catches being mounted on a common clamp-on bracket secured to said threading member.

9. Stringing apparatus as set forth in claim 1 wherein said trailing free end portion extends down from the trailing bend portion to avoid catching on the tower.

10. Aerial stringing apparatus for passing a threading line through a line holding structure on a tower with no side access while suspended from above by an aircraft carrying a hoist line with an end ball, said apparatus comprising:

an elongated threading member constructed of a single piece of hollow aluminum tubing having a square cross section;

a hook-shaped leading line coupling part mounted on said threading member at a front position and a hook-shaped trailing line coupling part mounted on said threading member disposed rearwardly of and spaced from said leading line coupling part at the balance point of said threading member, the hooks of said leading and trailing line coupling parts being arranged opposite and facing toward one another, said leading line coupling part including a leading shank portion connected at one end to the threading member, a leading bend portion, and a leading free end portion defining a leading line-receiving opening between said leading free end portion and said leading shank portion and an inside line-receiving area along said leading bend portion, said leading shank portion extending substantially lengthwise of said threading member, said leading bend portion extending substantially transverse to said threading member, and said leading free end portion extending from said bend portion toward said trailing end of said threading member and then flared to extend laterally away from said leading shank portion, said leading line coupling part being fastened to the front of said tubing by means of a sleeve that telescopes over the threading member, said leading line coupling part having a front end member of right angle cross section to which the leading shank portion is affixed and on which said leading shank portion is seated in an inside corner, and at least one fastener that extends through said threading member, said sleeve, and said front end member, said trailing line coupling part including a trailing shank portion pivotally connected at one end to a mounting bracket on said threading member, a trailing bend portion, and a trailing free end portion defining a line-receiving opening between said trailing free end portion and said trailing shank portion, and a trailing line-receiving area along the inside of said trailing bend portion, said trailing shank portion extending substantially lengthwise of said threading member, said trailing bend portion extending substantially transverse to said threading member, and said trailing free end portion extending from said bend portion toward said leading end of said threading member and then laterally away from said leading shank portion, said trailing line coupling part being pivotal about an axis substantially transverse to said threading member at the balance point of said threading member, said trailing line coupling part being between a horizontally disposed lowered position and a vertically disposed raised position, said leading bend portion being in a line with the center of said threading member to locate said hoist line along said center to prevent said threading member from twisting about its axis when suspended from said hoist line, said trailing shank portion extending across the threading member at a slight angle to the longitudinal axis of said threading member to locate the trailing bend portion to one side of the threading member;

means including a clamp-on bracket for fastening a threading line to the trailing end of said threading member; and tower catch means on said threading member including an upper catch and a lower catch on a common bracket on the threading member for releasably fastening said threading member to the tower after said hoist line is released from one of said line coupling parts, said hoist line being coupled to said trailing line coupling part for moving the leading end portion of said threading member and leading line coupling part through said structure, said tower catch means engaging the tower, said hoist line being released from said trailing coupling part and coupled to said leading line coupling part, and said threading member and threading line being moved through said structure while suspended from said aircraft.

* * * * *